July 17, 1973 D. J. SHARP 3,746,541
METHOD OF IRRADIATING A NON-LINE-OF-SIGHT SURFACE OF A SUBSTRATE
Filed Jan. 28, 1971 2 Sheets-Sheet 1

INVENTOR
D. J. SHARP
By J. Rosenstock
ATTORNEY

United States Patent Office 3,746,541
Patented July 17, 1973

3,746,541

METHOD OF IRRADIATING A NON-LINE-OF-SIGHT SURFACE OF A SUBSTRATE

Donald Jex Sharp, Lawrence Township, Mercer County, N.J., assignor to Western Electric Company, Incorporated, New York, N.Y.

Filed Jan. 28, 1971, Ser. No. 110,405
Int. Cl. G03c 5/00, 11/00
U.S. Cl. 96—38.4 11 Claims

ABSTRACT OF THE DISCLOSURE

A method of irradiating a non-line-of-sight surface of a substrate comprises placing a suitable mixture contiguous to the surface. A suitable mixture is one comprising a transmitting medium and a radiation direction-altering medium dispersed therethrough. A source of a desired radiation is directed at the mixture. The desired radiation is transmitted by the transmitting medium and a portion of the transmitted radiation is dispersed, reflected and/or refracted by the radiation direction-altering medium to the non-line-of-sight surface.

BACKGROUND OF THE INVENTION

(1) Field of the invention

This invention relates to a method of irradiating a non-line-of-sight surface of a substrate and more particularly, to irradiating a hidden surface of a substrate by means of a mixture comprising a radiation transmitting medium and a radiation direction-altering medium dispersed therethrough.

(2) Description of the prior art

Many circuit housings of new and complex geometries, such as telephone bases and/or handsets, have a plurality of internal surface configurations appropriate for housing conductor patterns so as to permit the fabrication therein of conformal circuits, i.e., circuits having the same configuration as the internal surface. Many methods for fabricating conformal circuits require a step of irradiating the surface configuration. Among such methods of fabricating such conformal circuits is the photoselective metal deposition process of M. A. De Angelo et al. U.S. Pat. 3,562,005, filed Apr. 9, 1968, and assigned to the assignee hereof, which utilizes ultraviolet radiation.

A problem is encountered, however, when the internal surface configurations of the housing are non-line-of-sight, i.e., are hidden surfaces which are not directly exposed to the required radiation. Where a non-line-of-sight surface is present, a source of radiation can be directed at the hidden surface by either (1) a long exposure time in a suitably dust-laden embodiment wherein trivial Tyndall scattering would occur or (2) a plurality of radiation sources directed at the housing from different angles to attain diffused radiation exposure of the hidden surface.

A method which leads to irradiation of a non-line-of-sight surface without a long exposure period and without the use of a plurality of radiation sources is, therefore, desirable.

SUMMARY OF THE INVENTION

The present invention is directed to a method of irradiating a non-line-of-sight surface of a substrate and more particularly, to irradiating a non-line-of-sight surface by means of a mixture comprising a radiation transmitting medium and a radiation direction-altering medium, e.g., a radiation dispersing and refracting and/or a reflecting medium, dispersed therethrough.

The method includes first selecting a suitable transmitting medium which transmits a desired radiation without undue absorption thereof. A suitable radiation direction-altering medium, i.e., a medium which will disperse and reflect and/or refract the desired radiation, is mixed with and dispersed throughout the transmitting medium to form a mixture. The resultant mixture is then situated contiguous to a selected area of a suitable substrate, defined either by walls which are non-liner, e.g., non-linear apertures, channels, grooves, etc., or have surfaces which are hidden, i.e., cannot be directly exposed to the desired radiation.

A sufficient amount of the mixture is employed so as to adequately expose the selected area to a source of the desired radiation. The mixture is then exposed to the source of the radiation whereby the desired radiation is transmitted through the mixture, by the transmitting medium, and the transmitted radiation is directed onto the selected area, by the radiation direction-altering medium.

DESCRIPTION OF THE DRAWING

The present invention will be more readily understood by reference to the following drawing taken in conjunction with the detailed description, wherein.

DETAILED DESCRIPTION

The present invention is described primarily in terms of irradiating a non-line-of-sight or hidden surface of a substrate with ultraviolet radiation during a photoselective metal deposition process. However, it will be understood that such description is exemplary only and is for purposes of exposition and not for purposes of limitation. It will readily be appreciated that the inventive concept described is equally applicable to all forms of radiation and to a plurality of well-known processes utilizing such radiation to irradiate a substrate surface, e.g., in curing or cross linking polymeric materials, such as photoresists.

Figure 1:
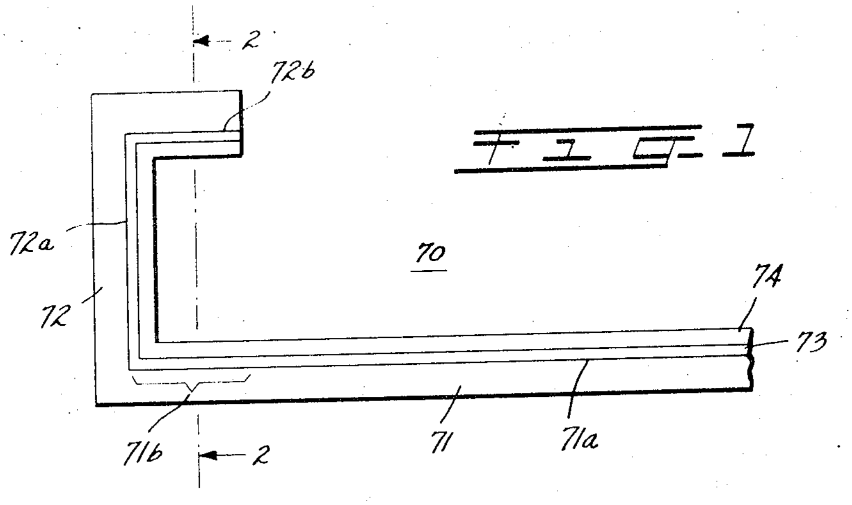
FIG. 1 is a cross-sectional view of a typical substrate having a non-line-of-sight surface.

With reference now to FIG. 1 there is shown a suitable substrate 70 having a base 71 which terminates in an L-shaped end 72. A suitable substrate may encompass a wide variety of materials which are dependent upon the intended use thereof. For the production of electrical circuit patterns suitable substrates are those which are generally non-conductive, e.g., fluorinated ethylene propylene, polytetrafluoroethylene, etc. In general, suitable substrates are those revealed and discussed in M. A. De Angelo et al., U.S. Pat. 3,562,005, filed Apr. 9, 1968, assigned to the assignee hereof and incorporated by reference hereinto.

A suitable photopromoter solution is applied utilizing procedures revealed in M. A. De Angelo et al. to internal surface areas **71*a*, 72*a* and 72*b* of substrate 70, to form a photopromoter layer 73. A suitable photopromoter solution may be either a positive type or a negative type as discussed in M. A. De Angelo et al. A suitable mask 74, either positive or negative depending on whether the photopromoter is positive or negative, is then placed contiguous to the photopromoter layer 73**. A suitable mask is one as discussed in De Angelo et al., and typically comprises a quartz body having a radiation-opaque pattern thereon.

Figures 2, 3:
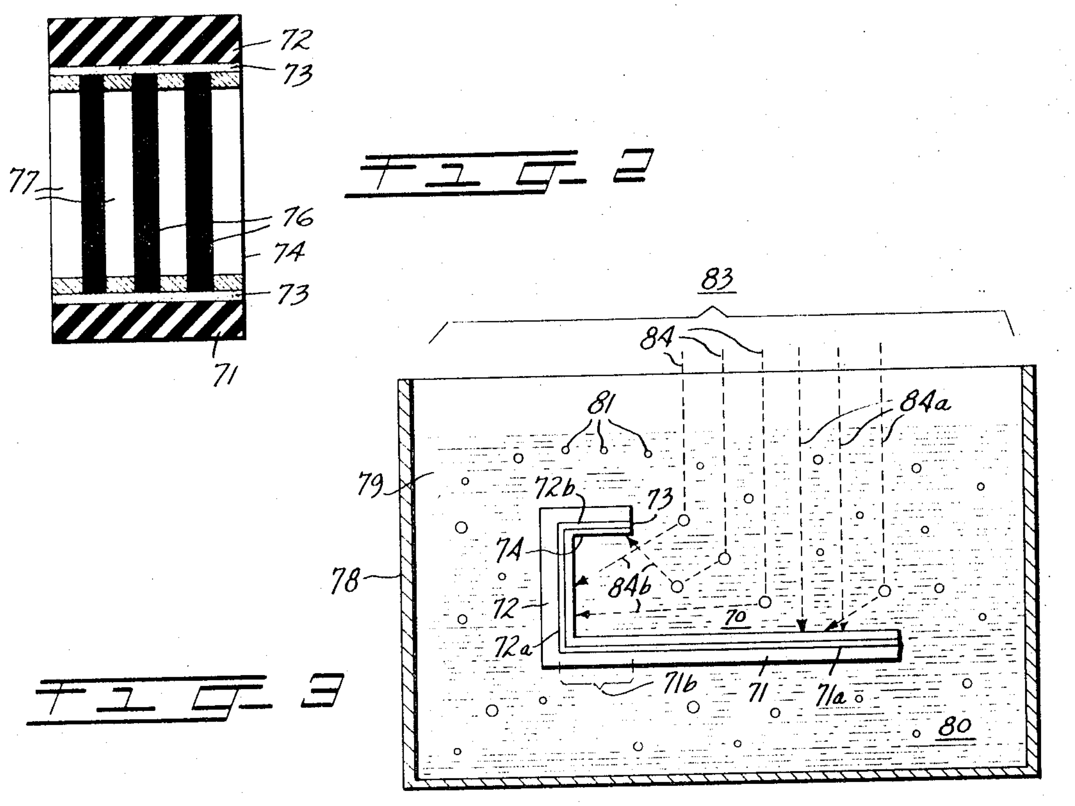
FIG. 2 is an end view of the substrate of FIG. 1 taken along line 2—2 of FIG. 1.
FIG. 3 is a cross-sectional view of the substrate of FIG. 1 exposed by the novel irradiating method of the present invention.

Referring to FIG. 2, the mask 74 has areas 76 which are opaque to a radiation to which the mask 74 is destined to be exposed. The remaining areas 77 of the mask 74 are capable of transmitting therethrough the radiation, to which the mask 74 is to be exposed. It should be noted that in the alternative, separate masking areas may be applied to layer 73, utilizing standard materials and techniques known in the art, e.g., using photoresist materials which are opaque to the radiation to be employed.

Referring to FIG. 3, a suitable mixture 80 is prepared and contained in a container 78, fabricated from any suitable material which will not react with the components of the mixture. A suitable mixture 80 is one comprising a transmitting medium 79 and a radiation direction-altering medium 81 (greatly enlarged in FIG. 3 for illustrative purposes only). A suitable transmitting medium 79 is any fluid which is (a) physically and chemically unreactive with the photopromoter coated and masked substrate 70 destined to be immersed in the mixture 80, and (b) transparent, i.e., the fluid doesn't absorb appreciable amounts of the radiation to be employed. Generally, the medium 79 is any fluid providing a useful amount of radiation transmittance. What is a useful amount of radiation transmittance is, of course, dependent upon (1) the application of the radiation, (2) the radiation employed and (3) the depth to be employed of the transmitting fluid, all of which are factors which are well known or can be easily ascertained without undue experimentation by one skilled in the art. For ultraviolet radiation of short waavelength, i.e., less than 3,000 A., a typical suitable transmitting medium is water and a practical depth typically may be 5 cm. It is to be noted, however, that this 5 cm. depth is one of practicality and is not one of limitation, for more extensive depths may be employed with longer exposure and/or stronger ultraviolet radiation sources.

A suitable radiation direction-altering medium 81 is any material which (a) doesn't react with the transmitting medium, (b) doesn't react with the masked substrate 70 destined to be immersed in the mixture 80 and (c) disperses, reflects and/or refracts the radiation to be employed. For ultraviolet radiation of short wavelength (less than 3,000 A.) some typical suitable radiation direction-altering media are particulate mica, aluminum, alumina, silver, silica and chromium.

In preparing the mixture 80, the radiation direction medium 79 is combined with the transmitting medium 81 and mixed therewith to form a colloidal suspension of the radiation direction medium 81 in the transmitting medium 79. The colloidal suspension may comprise a dispersed phase in a solid, in a liquid (hydrosol), or in a gas (aerosol). A colloidal suspension is preferred and, therefore, the radiation direction medium 81, suspended in the transmitting medium 79, should be submicron in size, typically ranging from 0.1 to 0.001$\mu$, depending, of course, on the materials involved. It should be pointed out, however, that a colloidal suspension is not essential and that particles of greater than submicron size can be employed and kept in suspension by means well known in the art, e.g., by using mechanical agitation of the mixture, or by employing transparent thickeners such as gelatin or silica gel to make a liquid transmitting fluid thixotropic.

It should be noted that the particle size of the radiation direction-altering medium 81 should not be so small as to be incapable of interacting with the radiation to be employed. If such non-interaction takes place, the medium 81 is incapable of functioning in a reflective or refractive manner. The various factors to be taken into consideration when determining whether particles are too small to interact with a radiation to which they are to be exposed are well known or can be easily ascertained without undue experimentation by those skilled in the art.

The suitably masked substrate 70 is immersed in the mixture 80 and supported therein by any conventional means (not shown) known in the art. The immersed substrate 70 has a plurality of non-line-of-sight or hidden interior surface areas 72*a*, 72*b*, 71*b*, all of which are covered by layer 73 and mask 74. By a non-line-of-sight or hidden surface area is meant a surface area that cannot be directly exposed to a single source of air ambient dispersed rays of a selected radiation. It should be noted that the air ambient is the normally occurring air medium which contains a plurality of particles dispersed therethrough, which particles are incapable of effectively dispersing a radiation transmitted to them.

A radiation source 83 is directed at the immersed substrate 70 and the mixture 80, contiguous to the substrate 70 and hidden surface areas 71*b*, 72*a* and 72*b*. For photoselective metal deposition, as described by M. A. De Angelo et al., the radiation source 83 should be an ultraviolet radiation source of short wavelength (less than 3,000 A. and typically about 1,800 A. to about 2,900 A.). For such ultraviolet radiation applications some typical transmitting media, in addition to the water previously mentioned, are methanol, ethanol, isopropanol, propanol, dimethyl ether, and diethyl ether. Some typical radiation direction-altering media, as mentioned previously, are mica, alumina, aluminum, silver, silica, and chromium.

A plurality of radiation rays 84, emanating from the ultraviolet source 83, pass into the transmitting medium 79, e.g., water, and are transmitted thereby to form transmitted rays 84*a*. The transmitted rays 84*a* would not ordinarily readily strike hidden areas 71*b*, 72*a*, 72*b* and the photopromoter layer 73 covering them if the substrate 70 was in an ordinary air ambient or for that matter in a pure transmitting medium such as water. However, a portion or a part of the transmitted rays 84*a* strike the suspended radiation direction-altering means 81, e.g., colloidally suspended aluminum, and are dispersed, reflected and/or refracted into a plurality of direction-altered rays 84*b*, to which the photopromoter covered hidden surface areas 71*b*, 72*a* and 72*b* are exposed through mask 74. The remainder of the transmitted rays 84*a* are directed to the directly exposed regions of surface 71*a* covered by photopromoter layer 73. The transmitted ultraviolet rays 84*a*, and the transmitted, dispersed, reflected and/or refracted rays 84*b* pass through the mask 74 at regions 77 (FIG. 2) thereby exposing the photopromoter layer 73, e.g., $Sn^{+2}$ containing layer, covering areas 71*a*, 72*a* and 72*b* to the rays 84*a* and 84*b*.

Figure 4:
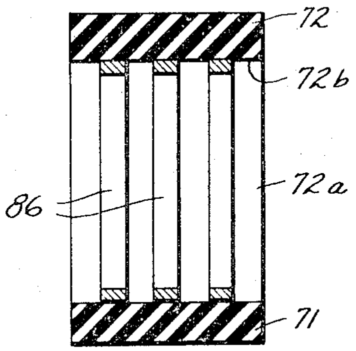
FIG. 4 is an end view of the irradiated substrate of FIG. 1 after selective metal deposition thereupon.

The radiation-exposed substrate 70 is removed from the mixture and, as described by M. A. De Angelo et al., is immersed in a precious metal ion containing solution, e.g., $Pd^{+2}$ solution, wherein the precious metal is deposited on the desired region of the substrate 70. The precious metal deposited substrate 70 is then immersed in a conventional electroless metal plating bath, e.g., a copper plating bath, wherein an electroless metal deposition on the substrate 70 occurs. The electroless metal deposited substrate 70 may then be further electroplated in a standard metal electroplating bath. The final metal plated substrate is illustrated in FIG. 4 which shows a plurality of metal conductors 86, e.g., copper, pattern deposited on the substrate 70.

Figure 5:
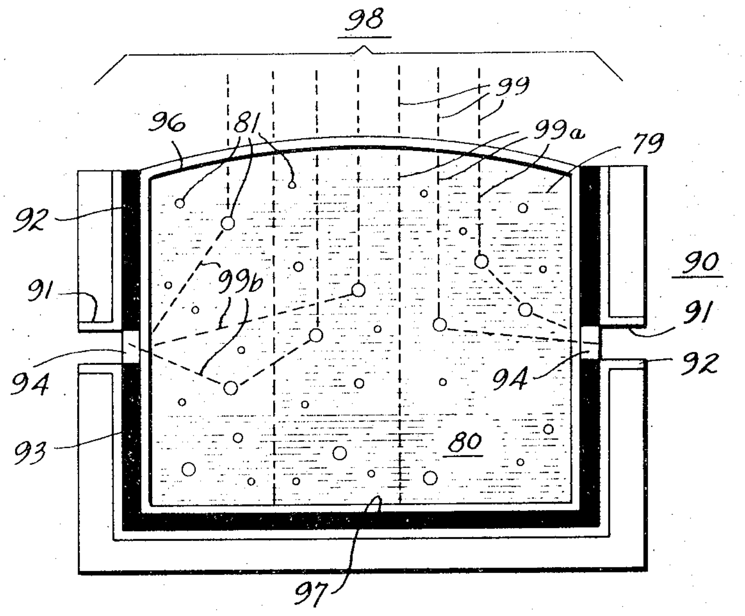
FIG. 5 illustrates an alternative embodiment of the novel irradiation method of the present invention.

FIG. 5 illustrates an alternative embodiment of the invention disclosed herein employing the photoselective metal deposition techniques disclosed in M. A. De Angelo et al., U.S. Pat. 3,562,005. A U-shaped substrate 90 having apertures 91—91 is coated with a suitable positive photopromoter solution, e.g., $Sn^{+2}$ containing solution, to form a photopromoter layer 92. A suitable mask 93 is selected having radiation transmitting areas 94—94 corresponding to the apertures 91—91. A suitable container 96 is selected. A suitable container 96 is a container fabricated from any material which is transparent to a selected radiation. Additional desirable features of the container 96 may be flexibility and/or heat moldability. Some typical containers for ultraviolet radiation are fabricated from polyethylene and fluorinated ethylene propylene.

The container 96, e.g., a fluorinated ethylene propylene bag, is filled with the mixture 80 comprising the transmitting medium 79 and the radiation direction-altering medium 81, previously discussed. The filled container 96 is first closed, by conventional means known in the art, so as to completely contain the mixture 80, and is then shaped, by conventional means known in the art, so as to conform to the surface 97 of the mask 93 onto which it is placed.

The substrate 90 and the container 96 containing mixture 80 are exposed to an ultraviolet radiation source 98. As discussed previously, a plurality of ultraviolet rays 99 emanate from source 98, pass through container 96 and are transmitted by the transmitting medium 79 to form transmitted rays **99*a*. A portion or a part of the transmitted rays 99*a* strike the dispersed radiation direction-altering medium 81 and are dispersed, reflected and/or refracted to form direction-altered rays 99*b*. The walls of apertures 91, having photopromoter layer 92 thereon, are exposed to the direction-altered rays 99*b* which strike the photopromoter covered walls of apertures 91—91 through the transmitting areas 94—94 of mask 93. The positive photopromoter layer 92 covering the walls of apertures 91—91 is thus converted to a species which does not reduce a precious metal salt to which it is destined to be exposed. Therefore, upon successive exposure of the radiation exposed substrate 90 to a precious metal salt containing bath and an electroless plating bath, an electroless deposition upon the walls of apertures 91—91** does not result.

It should be noted that a negative photopromoter and a negative mask could have been employed equally as well as a positive photopromoter and a positive mask, as discussed by De Angelo et al.

EXAMPLE (A) For comparison purposes, a partially collimated beam of ultraviolet light from a mercury glow discharge lamp, having a spectral output predominantly at 2,537 A., was passed into a square quartz container, through an open end thereof. The quartz container contained 110 milliliters of deionized water. The quartz container was of an appropriate size (2″ long x 2″ wide) such that the broadening beam of the ultraviolet light passed out of the container before touching the sides of the container parallel to the beam. The only light, therefore, that could be measured at the parallel sides was that from incidental beam leakage, from refraction, from reflection or from a combination thereof.

A conventional, commercially available inferentially filtered (2,537 A.) photometer was then used to measure the intensity of the ultraviolet light at the sides of the quartz container and on a straight line through the container. The side relative scale intensity was 0.0006. The straight line relative scale intensity was 1.8.

(B) The procedure of A was followed except that a colloidal suspension, of 0.5 gram silica (commercially obtained and having an average particle size of 0.012 micron) dispersed in a solution comprising 100 ml. of deionized water and 4.9 grams of isopropanol, was contained in the quartz container. The isopropanol was added merely to facilitate rapid wetting and hence dispersion of the silica in the water. The intensity of the ultraviolet light at the sides of the quartz container and on a straight line through the container was measured. The side relative scale intensity was 0.065. The straight line relative scale intensity was 0.050.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A method of irradiating a hidden surface with ultraviolet radiation, which comprises:

placing a colloidal suspension comprising (a) a liquid radiation transmitting medium selected from the group consisting of water, methanol, ethanol, isopropanol, propanol, dimethyl ether, diethyl ether or mixtures thereof, and (b) a radiation direction-altering medium dispersed therethrough, selected from the group consisting of alumina, silica, aluminum, silver, mica, chromium, or mixtures thereof, said direction-altering medium comprising colloidal particles ranging from 0.01$\mu$ to 0.1$\mu$, contiguous to the hidden surface; and exposing said suspension to a source of ultraviolet radiation to (1) transmit said radiation, and (2) alter the direction of a portion of said transmitted radiation to irradiate the hidden surface.

2. The method as defined in claim 1 wherein:

said (a) comprises water, and said (b) is silica.

3. In an improved method of rendering a substrate selectively capable of reducing on a hidden surface thereof a precious metal from a precious metal salt, which comprises the steps of coating the hidden surface of the substrate with a photopromoter and producing a pattern capable of reducing the precious metal from the precious metal salt by selectively exposing portions of the photopromoter coated hidden surface to a source of short wavelength ultraviolet light, the improvement comprising:

placing a colloidal suspension comprising (a) a liquid radiation transmitting medium selected from the group consisting of water, methanol, ethanol, isopropanol, propanol, diethyl ether, dimethyl ether or mixtures thereof, and (b) colloidal particles, ranging from 0.001$\mu$ to 0.1$\mu$, of a radiation direction-altering medium, selected from the group consisting of alumina, silica, aluminum, silver, mica, chromium or mixtures thereof, dispersed therethrough, contiguous to the photopromoter coated hidden surface; and exposing said suspension to the source of ultraviolet radiation to (1) transmit the radiation, and (2) alter the direction of a part of said transmitted radiation to selectively expose the portions of the photopromoter coated hidden surface thereto.

4. The method as defined in claim 3 wherein:

said (a) comprises water, and said (b) is silica.

5. In an improved method of producing a metallic pattern on a hidden surface of a substrate which comprises the steps of coating the hidden surface with a photopromoter, producing a pattern capable of reducing a precious metal from a precious metal salt by selectively exposing a portion of the photopromoter coated hidden surface to a source of short wavelength ultraviolet light, immersing the substrate in a precious metal salt solution to reduce on the pattern the precious metal, and then placing the precious metal pattern in an electroless plating bath which is catalyzed by the reduced precious metal to produce the metallic pattern, the improvement comprising:

placing a colloidal suspension comprising (a) a liquid radiation transmitting medium selected from the group consisting of water, methanol, ethanol, isopropanol, propanol, diethyl ether, dimethyl ether or mixtures thereof, and (b) colloidal particles ranging from 0.001$\mu$ to 0.1$\mu$ of a radiation direction-altering medium, selected from the group consisting of alumina, silica, aluminum, silver, mica, chromium or mixtures thereof, dispersed therethrough, contiguous to the photopromoter coated hidden surface; and exposing said suspension to the source of ultraviolet radiation to (1) transmit said radiation, and (2)

alter the direction of a part of said transmitted radiation to selectively expose the portion of the photopromoter coated hidden surface thereto.

6. The method as defined in claim 5 wherein:
said (a) comprises water, and
said (b) is silica.

7. In an improved method of producing a precious metal pattern on a hidden surface of a substrate, the pattern being usable to catalyze and reduce thereon metal from an electroless bath, which method comprises affecting retention on selected areas of the hidden surface of the substrate of a first solution containing a salt of a metal selected from the group consisting of tin, titanium and lead, the oxidation number of the metal ion of the first solution being alterable by exposure thereof to radiation deep within the ultraviolet spectrum, selectively exposing the selected areas to the radiation to generate a pattern of the metal ion capable of reducing the precious metal, and then immersing the pattern in a second solution containing a salt of the precious metal to produce the precious metal pattern, the improvement comprising:

placing a colloidal suspension comprising (a) a liquid radiation transmitting medium selected from the group consisting of water, methanol, ethanol, isopropanol, propanol, diethyl ether, dimethyl ether or mixtures thereof, and (b) colloidal particles ranging from 0.001$\mu$ to 0.1$\mu$ of a radiation-direction altering medium, selected from the group consisting of alumina, silica, aluminum, silver, mica, chromium or mixtures thereof, dispersed therethrough, contiguous to the photopromoter coated hidden surface; and exposing said suspension to the radiation to (1) transmit the radiation, and (2) alter the direction of a portion of said transmitted radiation to selectively expose the selected areas of the hidden surface thereto.

8. The method as defined in claim 7 wherein:
said (a) comprises water, and
said (b) is silica.

9. In an improved method of producing a metallic pattern on a hidden surface of a nonconductive substrate which comprises the steps of absorbing onto selected areas of the hidden surface of the nonconductive substrate a metal halide solution, the metal being selected from the group consisting of tin, lead and titanium, the metal ion thereof being capable of reducing a precious metal from a precious metal salt, exposing selected portions of the selected areas of the hidden surface to ultraviolet light until the metal ion thereat is rendered incapable of reducing the precious metal from the precious metal salt, the selected portions conforming to a negative of the pattern and the ultraviolet light having a wavelength in the range of about 1,800 A. to about 2,900 A., immersing the substrate in the precious metal salt solution whereby the ion reduces the precious metal therefrom onto the selected areas in the pattern, and then immersing the substrate in an electroless plating bath which is catalyzed by the reduced precious metal to produce the metallic pattern, the improvement comprising:

placing a mixture comprising (a) a liquid radiation transmitting medium selected from the group consisting of water, methanol, ethanol, isopropanol, propanol, diethyl ether, dimethyl ether or mixtures thereof, and (b) colloidal particles ranging from 0.001$\mu$ to 0.1$\mu$ of a radiation-direction altering medium, selected from the group consisting of alumina, silica, aluminum, silver, mica, chromium or mixtures thereof dispersed therethrough, contiguous to the photopromoter coated hidden surface; and exposing said suspension to the ultraviolet light to (1) transmit the ultraviolet light, and (2) alter the direction of a part of said transmitted ultraviolet light to expose the selected portions of the selected areas of the hidden surface thereto.

10. The method as defined in claim 9 wherein:
said (a) comprises water, and
said (b) is silica.

11. A method of irradiating a hidden surface, which comprises:

placing a suspension comprising (a) a liquid radiation transmitting medium comprising about 100 parts of water, and about 4.9 parts of isopropanol, and (b) about 0.5 part of silica particles dispersed therethrough, said silica particles having an average particle size of 0.012 micron, contiguous to the hidden surface; and exposing said suspension to a source of ultraviolet radiation to (1) transmit said radiation and (2) alter the direction of a portion of said transmitted radiation to irradiate the hidden surface.

References Cited

UNITED STATES PATENTS

| | | | |
|---|---|---|---|
| 1,658,509 | 2/1928 | Beebe | 96—37 X |
| 2,153,166 | 4/1939 | Wynd | 96—37 U X |
| 3,577,239 | 4/1971 | Lesnieski | 96—36.2 |
| 3,615,470 | 10/1971 | Singletary | 96—37 |
| 3,562,005 | 2/1971 | De Angelo et al. | 96—36.2 X |

DAVID KLEIN, Primary Examiner

U.S. Cl. X.R.

96—36.2, 37, 27 E

UNITED STATES PATENT OFFICE
CERTIFICATE OF CORRECTION

Patent No. 3,746,541 Dated July 17, 1973

Inventor(s) DONALD JEX SHARP

It is certified that error appears in the above-identified patent and that said Letters Patent are hereby corrected as shown below:

In the specification, column 2, line 8, "liner" should read --linear--. Column 3, line 30, "waavelength" should read --wavelength--.

In the claims, column 8, claim 9, lines 15 and 16, "thereof dispersed" should read --thereof, dispersed--.

Signed and Sealed this

Thirteenth Day of July 1976

[SEAL]

*Attest:*

RUTH C. MASON
*Attesting Officer*

C. MARSHALL DANN
*Commissioner of Patents and Trademarks*